P. W. SWAN.
WIND SHIELD WIPER.
APPLICATION FILED FEB. 19, 1918.

1,287,511.

Patented Dec. 10, 1918.

Inventor
Perry W. Swan
By Lancaster and Allport
his Attorneys

UNITED STATES PATENT OFFICE.

PERRY W. SWAN, OF NORTH YAKIMA, WASHINGTON.

WIND-SHIELD WIPER.

1,287,511.   Specification of Letters Patent.   Patented Dec. 10, 1918.

Application filed February 19, 1918.   Serial No. 218,121.

*To all whom it may concern:*

Be it known that I, PERRY W. SWAN, a citizen of the United States, residing at North Yakima, in the county of Yakima and State of Washington, have invented a new and useful Wind-Shield Wiper, of which the following is a specification.

The present invention relates to a device for removing rain, snow and water of condensation from window panes, and the like and has particular reference to a device for use on the shields of automobiles.

The object of this invention is to provide a device of this nature which may be applied to the windshield of an automobile without permanent attachment thereto, or requiring any particular formation of the windshield and its parts; a device which may be quickly placed over the edge of the windshield and moved or adjusted into any desired position thereon out of the way when not in use; and a device which may be easily used by merely grasping the inner part thereof and moving it in the desired direction for clearing the glass.

The invention also embodies certain other important features of construction which will be hereinafter more particularly described and pointed out in the following detailed description of the present preferred embodiment, the same being illustrated in the accompanying drawing, wherein.

Figure 1:
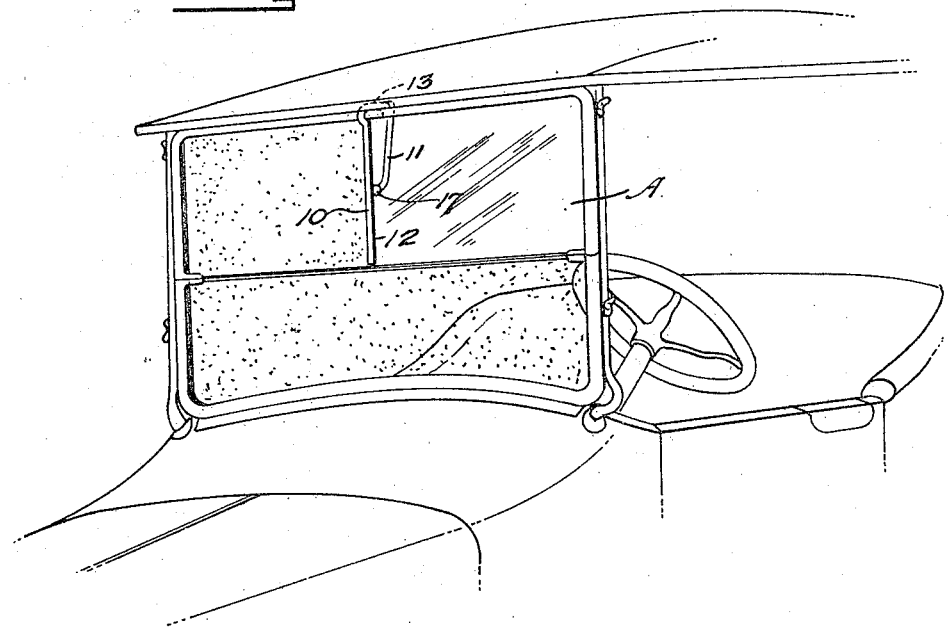
Figure 1 is a perspective view of the windshield cleaner constructed according to this invention and as applied to the windshield of an automobile.
Figures 2, 3, 4, 5:
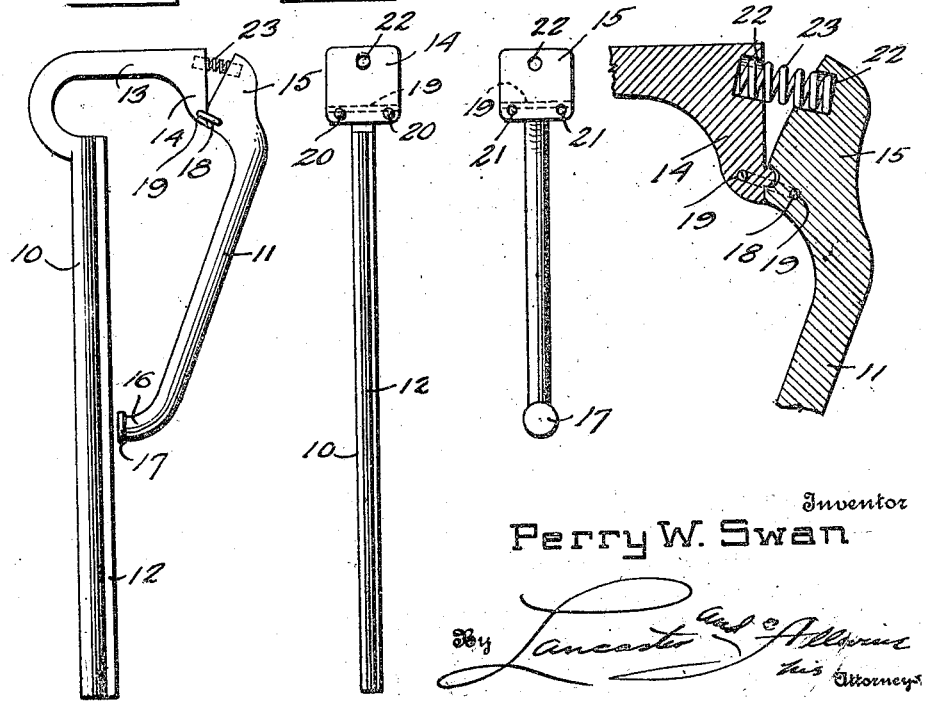
Fig. 2 is a side elevation of the device.
Fig. 3 is an inner edge view of the squeegee or outer arm of the device.
Fig. 4 is an inner edge view of the handle or inner part of the device.
Fig. 5 is a fragmentary enlarged section through the device at its joint, showing the spring and the bearing parts of the arms.

Referring to the drawing by numerals, the present embodiment of the invention is disclosed in the form of a pair of arms 10 and 11. The arm 10 is preferably of sheet metal tubular construction with the longitudinal edges of the tube turned outward and receiving therebetween a relatively soft strip 12 of rubber or the like forming a squeegee extending throughout substantially the length of the arm 10. The upper end of the arm 10 is provided with a bridge or arch 13 constituting the head of the arm and which projects from the side of the arm opposite the strip 12, and is returned in spaced relation over the upper end of the arm and extends beyond the longitudinal plane of the strip 12.

The bridge portion 13 is provided upon its free end with a depending lug or enlargement 14 forming a head and having a flat end face lying in a plane substantially parallel with that of the arm 10.

The arm 11 may also be of tubular sheet metal construction and provided with an enlargement or head 15 having a flat face lying in a plane substantially parallel with that of the arm 11. The lower end of the arm 11 is provided with a presser foot 16 extending in the direction of the head 15, and carries upon its end a pad 17 serving as a friction element.

The arms 10 and 11 are connected together at their heads by means of a link 18 of wire or the like which is threaded through transverse openings 19 formed in the lower ends of the heads for hinging the same together. One of the heads, such as the head 14, is provided at its lower end and upon its flat face with outstanding studs 20 of semi-spherical contour, the projections 20 being spaced apart transversely and adapted to engage in correspondingly formed sockets 21 in the face of the other head, such as the head 15.

The upper ends of the heads 14 and 15 are provided in their flat faces with sockets 22 into which are seated the opposite ends of a spring 23 of the expanding type adapted to urge the upper ends of the heads apart to swing upon the projections 20. The projections 20 are adapted to take up the lateral and longitudinal thrust placed on the heads while the link 18 serves the purpose of holding the projections 20 in the depressions 21.

In use, the device may be placed over the upper edge of a windshield A with the long arm 10 against the outer side of the windshield and the shorter arm 11 against the inner side thereof. The arched portion 13 is looped over the top of the frame of the windshield and extends inwardly beyond the same, the forward bulge of the arched portion 13 accommodating the thickness of the frame beyond the outer surface of the glass. The spring 23 urges the presser foot 16 against the inner side of the glass, and pressure is transmitted through the arched portion 13 to the long arm 10 for holding it under tension flat against the outer side of the windshield.

The arched portion 13 extends inwardly beyond the frame of the windshield a distance sufficient to support the upper end of the short arm 11 a distance from the windshield greater than the length of the presser foot 16 so that the arm 11 is inclined downward and toward the pane of glass for facilitating grasping of the arm and accommodating the spring 23. Of course the device may be engaged over the side of the frame of the windshield, or in any other suitable position with the arms at opposite sides of the pane of glass.

When it is desired to clear the glass of accumulations on the outer surface thereof, it is only necessary to grasp the arm 11 and move it along the windshield. This moves the squeegee over the outer surface of the windshield and wipes off the moisture or other accumulations.

Should it be desired to loosen the outer arm 10 from the pane of glass, should the squeegee stick in one position, it is only necessary to urge the upper end of the arm 11 toward the frame of the windshield to push the arched portion 13 over the top thereof and swing the arm 10 out from the pane of glass, the lower end of the arm serving for a fulcrum for this movement.

It is apparent that the device is relatively simple in construction, is light in weight, may be quickly and easily operated, and may be quickly and easily applied to and removed from windshields of practically any construction.

What is claimed is:

1. In a windshield wiper, the combination of a pair of arms each having on one end a head projecting laterally therefrom and provided with a flat outer face, a link hingedly connecting the lower ends of the heads together and one head having laterally spaced projections and the other head having recesses adapted to receive the projections, said projections forming pivotal supports for the heads and upon which said arms are adapted to move toward and from each other at their free ends, a spring arranged between the upper ends of the heads for urging the same apart to swing about said projections, and a wiper strip carried upon one arm and facing the other arm.

2. In a windshield wiper, the combination of an arm having an arched portion upon its upper end looped forwardly and extending rearwardly over the arm, a second arm, said arms each having on one end a head projecting laterally therefrom and provided with a flat outer face, the head upon said first named arm being formed at the rear end of the arched portion, a wiper strip carried upon said first arm and facing the second arm, means pivotally connecting said heads together and a spring arranged between the upper ends of the heads for urging the same apart and urging said second arm toward said first arm.

3. In a windshield wiper, the combination of an arm having an arched portion on its upper end looped forwardly and extending rearwardly over the arm, a head projecting laterally from the rear end of the arched portion, a second arm having a laterally projecting head formed upon its upper end, said heads having flat faces, a link hingedly connecting the lower ends of the said heads together, a wiper strip carried upon said first named arm and facing the second arm, the free end of the second arm being inturned, a pad upon the said inturned end, and a spring arranged between the upper ends of the heads for urging them apart.

4. In a windshield wiper, the combination of a pair of arms each having on one end a head projecting laterally therefrom and provided with a flat outer face, one head having laterally spaced projections and the other head having recesses adapted to receive the projections, said projections forming pivotal supports for the heads, and upon which said arms are adapted to move toward and from each other at their free ends, a wiper strip carried upon one arm and facing the other arm, and means pivotally connecting said heads.

5. In a windshield wiper, the combination of a pair of arms each having on one end a head projecting laterally therefrom and provided with a flat face, a link hingedly connecting the lower ends of the heads together, one head having laterally spaced projections and the other head having recesses adapted to receive the projections, said projections forming pivotal supports for the heads and upon which the arms are adapted to move toward or from each other at their free ends, a wiper strip carried upon one arm and facing the other arm, the free end of the other arm being inturned, a pad upon said inturned end, and a spring arranged between the upper ends of the heads for urging them apart to swing about said projections.

PERRY W. SWAN.